United States Patent [19]
Thiriet

[11] Patent Number: 5,894,550
[45] Date of Patent: Apr. 13, 1999

[54] METHOD OF IMPLEMENTING A SECURE PROGRAM IN A MICROPROCESSOR CARD, AND A MICROPROCESSOR CARD INCLUDING A SECURE PROGRAM

[75] Inventor: Fabien Thiriet, Orleans, France

[73] Assignee: Soliac, Montrouge, France

[21] Appl. No.: 08/784,343

[22] Filed: Jan. 16, 1997

[30] Foreign Application Priority Data

Jan. 19, 1996 [FR] France ................................. 96 00594

[51] Int. Cl.⁶ ......................................... G06F 12/14
[52] U.S. Cl. ........................ 395/185.07; 395/183.05; 395/186; 371/40.11
[58] Field of Search ................. 395/185.07, 182.02, 395/182.06, 183.05, 183.18, 186; 711/100, 102, 103, 104, 108, 163, 164, 167, 173, 212; 371/2.2, 21.1, 40.11, 40.4, 40.13, 40.14, 37.05

[56] References Cited

U.S. PATENT DOCUMENTS

| | | | |
|---|---|---|---|
| 4,184,201 | 1/1980 | Melberg et al. | 395/856 |
| 4,875,156 | 10/1989 | Tanagawa et al. | 395/186 |
| 5,452,431 | 9/1995 | Bournas | 711/115 |
| 5,500,949 | 3/1996 | Saito | 711/100 |
| 5,542,081 | 7/1996 | Geronimi | 395/800.37 |
| 5,630,057 | 5/1997 | Hait | 395/186 |
| 5,675,645 | 10/1997 | Schwartz et al. | 380/4 |

Primary Examiner—Dieu-Minh T. Le
Attorney, Agent, or Firm—Griggin, Butler Whisenhunt & Szipl, LLP

[57] ABSTRACT

A program is made secure relative to a CPU by storing in a first memory zone a series of predetermined-address functions that are directly executable by the CPU, by write protecting said first memory zone, and by storing the program in a second memory zone in the form of a series of instructions that are executable within the second memory zone or that activate functions contained in the first memory zone.

4 Claims, 1 Drawing Sheet

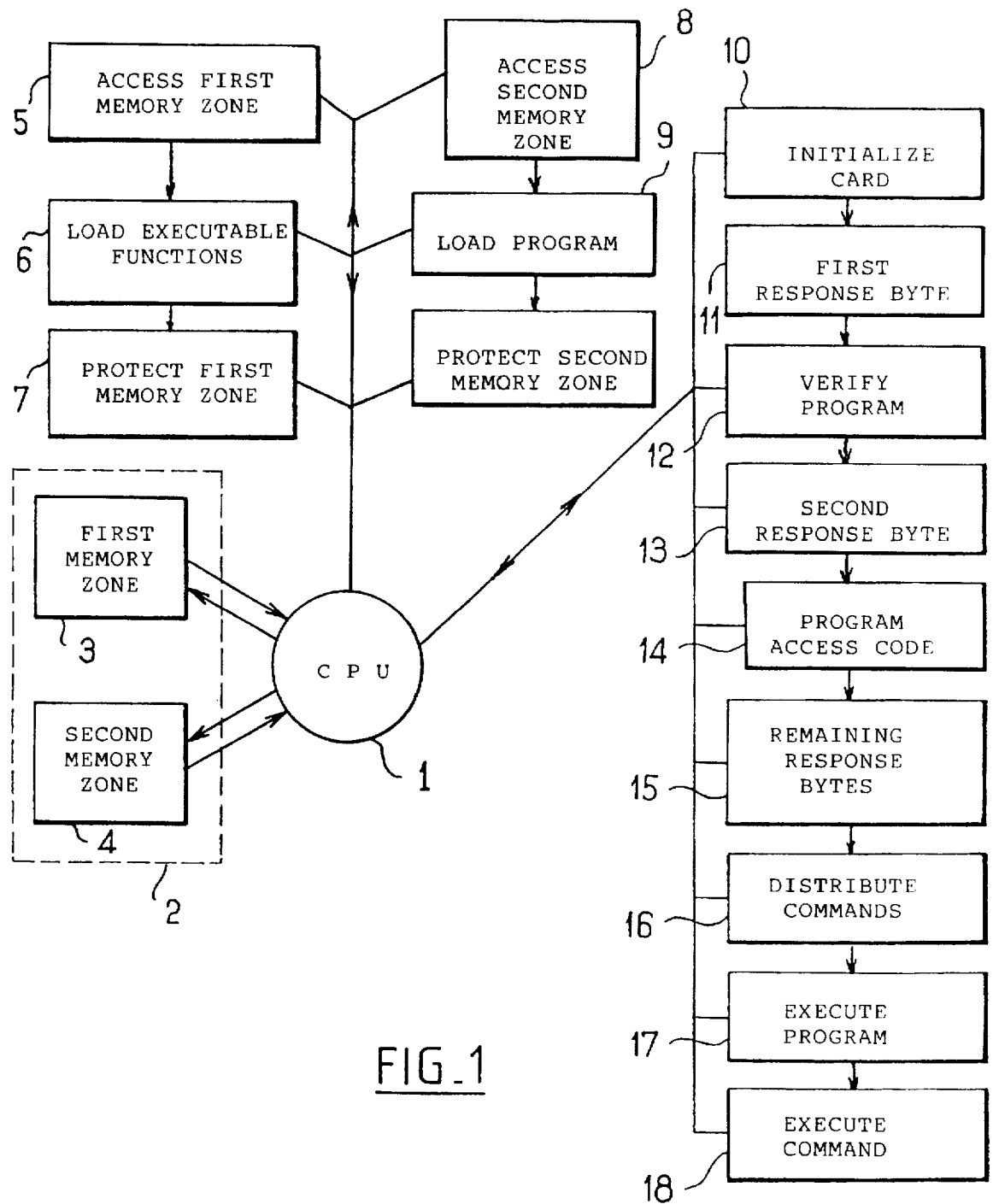
FIG_1

METHOD OF IMPLEMENTING A SECURE PROGRAM IN A MICROPROCESSOR CARD, AND A MICROPROCESSOR CARD INCLUDING A SECURE PROGRAM

The present invention relates to a method of implementing a secure program in a microprocessor card, and to a microprocessor card including a secure program.

BACKGROUND OF THE INVENTION

Most present microprocessors include not only random-access memory (RAM) and read-only memory (ROM) associated with a central processor unit (CPU) to enable the CPU to operate, but also electrically erasable programmable ROM (EEPROM) containing data specific to the bearer of the card and the basic application for which the card is intended. Operators, i.e. the companies that purchase cards from manufacturers to make them available to users, are demanding more and more frequently that a program which is personal to such operators be loaded in the EEPROM. For example, in a microprocessor card for radiocommunications purposes, certain operators require a voice message program to be installed. When the link between the EEPROM and the central unit is left entirely free, allowing the operator to load a program written in a language that is directly understandable for the CPU, then full control over the CPU is made available during program execution without any monitoring by the card manufacturer's operating system, i.e. the operating system is bypassed. Given control over the CPU, the operator's program can contain instructions giving access to any of the information contained in the card, including information that ought normally to be protected from the operator.

To avoid the operator's program taking control over the CPU, microprocessor cards are known in which the memory containing the operator's program needs to be loaded with special commands that are checked by an interpreter disposed between the memory and the CPU, the function of the interpreter being to verify that each command does not compromise the security of information present in the card and to transform the command into an instruction that is executable by the CPU. The drawback of such a system is that it is necessary to write the operator's program on the basis of commands understandable to the interpreter, which limits the options available to the operator's program. In addition, the operator's program is not executed directly but is initially transformed by the interpreter so that program execution speed suffers.

OBJECT AND SUMMARY OF THE INVENTION

The invention provides a method of implementing in a microprocessor card a program that is secure with respect to a CPU connected to the memory including memory zones, the method comprising the following steps: storing in a first memory zone a series of predetermined-address functions directly executable by the CPU; write-protecting said first memory zone; and storing the program in a second memory zone in the form of a series of instructions executable within the second memory zone or activating functions contained in the first memory zone.

Thus, for instructions that need to be executed within the second memory zone, the series of predetermined-address functions contained in the first memory zone constitutes a barrier between the program and the CPU, the program being incapable of activating a function executable by the CPU unless it is contained in the first memory zone.

In an advantageous version of the invention, the method includes, prior to launching the program, a step of verifying that the program includes only instructions that are executable within the second memory zone or that activate functions contained in the first memory zone. This prevents a dishonest person causing the operator's program to include a directly executable function that could compromise the security of information present in the card.

In another advantageous aspect of the invention, program verification is performed on initialization of the card between two series of initialization response bytes. Advantage is thus taken of the time interval between the two response bytes for the purpose of verifying the program, such that the initialization process is not lengthened.

The invention also provides a microprocessor card including a CPU connected to a memory including memory zones, the card including, in at least one first memory zone that is write-protected, a series of predetermined-address functions directly executable by the CPU, and in at least one second memory zone, a series of instructions that are executable within the second memory zone or that activate functions contained in the first memory zone.

The second memory zone is preferably also write-protected.

BRIEF DESCRIPTION OF THE DRAWING

Other characteristics and advantages of the invention appear on reading the following description of a particular non-limiting implementation of the method of the invention, given with reference to the sole accompanying FIGURE which is a diagram summarizing the method of the invention.

MORE DETAILED DESCRIPTION

With reference to the FIGURE, the microprocessor card of the invention includes in conventional manner a CPU 1 connected to RAM and to ROM that are not shown, and also to EEPROM 2, including in particular a first memory zone 3 and a second memory zone 4.

According to the invention, the first memory zone 3 is loaded with a series of predetermined-address functions which are directly executable by the CPU 1 of the card.

The first memory zone is loaded by the card manufacturer, e.g. in application of a series of operations illustrated by the lefthand side of the flow chart of FIG. 1 and including access at 5 to the first memory zone of the card, loading of executable functions at 6, and write protection of the first memory zone 3 at 7. The first memory zone 3 can be protected either by an access code associated with an authentification algorithm, the access code being known only to the manufacturer, or else by completely preventing writing to the first memory zone 3 after it has been loaded.

In the meaning of the invention, the term "a predetermined-address function" is a function that is executable at an address given explicitly in the function, or at an address that can be computed by the CPU on the basis of a definition given in the function, such that because of the write protection of the memory zone containing said functions, the definition of the addresses where the functions are executed cannot be modified by an operator's program. This disposition thus makes it possible to perform precise checking of all of the addresses that are accessible to an operator's program.

According to the invention, the second memory zone is loaded with the operator's program which is in the form of a series of instructions which are executable within the second memory zone or which activate functions contained in the first memory zone. The executable instructions can be any functions directly executable by the CPU, but whose parameters are fixed in such a manner as to determine whether they are executable in the second memory zone, i.e. whether they point to addresses within the second memory zone, or outside it. In this context, it will be observed that a function contained in the first memory zone, e.g. a read function or a write function, can still be executed outside said zone, but only at addresses that have been checked, as indicated above.

The operator's program can be loaded either by the card manufacturer at the request of the operator, or else directly by the operator, in application of the flow chart shown in the middle of FIG. 1, and which includes access to the second memory zone at 8, followed by loading the program into the second memory zone at 9.

Preferably, program loading is followed by an operation of protecting the second memory zone against writing by an external user.

All of the loading operations are performed under the control of the CPU and it is therefore possible to ensure that all of the instructions loaded into the second memory zone are verified as being executable within the second memory zone or as activating functions contained in the first memory zone. In order to mitigate the effects of any dishonest action on the contents of the second memory zone after it has been loaded normally, provision is preferably made prior to program loading for execution thereof to be inhibited, and a program launch procedure is provided as shown in the flow chart on the righthand side of FIG. 1 This flow chart includes initialization of the card at 10, sending a first byte in response to card initialization at 11, a step 12 of verifying the program contained in the second memory zone to ensure that all of its instructions are either executable within the second memory zone or else activate functions in the first memory zone, sending a second response byte at 13, optionally inputting a program access code at 14 to enable it to be launched, sending the remaining bytes in response to initialization at 15, distributing commands at 16, executing the program at 17, and executing the received command at 18.

Verification that a function called by the program is indeed contained in the first memory zone can be performed by consulting a table giving all of the launch addresses of functions contained in the first memory zone.

Naturally, program verification must result in a signal that prevents the program being launched if there is a wrong instruction in the program. The signal may be given, for example, by setting a flag in the second memory zone when verification is satisfactory, and resetting the flag otherwise. When it is necessary to input a code in order to execute the operator's program, it is also possible to provide a flag associated with input of that code. It will be observed that the first and second memory zones contain instructions that are directly executable such that after the program has been verified it will run without any constraint, unlike prior systems that need to include interpretation of each command prior to execution thereof.

Naturally the invention is not limited to the implementation shown and can be varied in ways that will appear to the person skilled in the art without going beyond the ambit of the invention as defined by the claims.

In particular, although the invention is described with reference to an EEPROM 2 containing only one first memory zone 3 and one second memory zone 4, it is possible without going beyond the ambit of the invention to provide a plurality of different programs loaded in different second memory zones and associated with a single first memory zone, or on the contrary associated with respective first memory zones containing corresponding executable functions.

Although the invention is shown as having the first memory zone within the EEPROM 2, thereby making it possible to load executable functions after the microprocessor has been put into the card, it is also possible to provide for the executable functions of the first memory zone to be loaded into the RAM or the ROM associated with the CPU, in which case the functions are included in the mask used for making the microprocessor.

I claim:

1. A method of implementing in a microprocessor card an operator's program that is secure with respect to a CPU connected to a memory including memory zones, the method comprising the following steps:

storing in a first memory zone a series of functions that are directly executable by a CPU as predetermined-address functions;

write-protecting said first memory zone; and storing the operator's program in a second memory zone, said operator's program consisting of a series of instructions that are either directly executable by the CPU at the predetermined address solely within the second memory zone or that activate functions executable by the CPU at the predetermined address contained in the first memory zone.

2. A method according to claim 1, including, prior to launching the operator's program, a step of verifying that the operator's program includes only instructions that are executable within the second memory zone or that activate functions contained in the first memory zone.

3. A method according to claim 2, wherein the operator's program verification is performed on initialization of the card in the time between two series of initialization response bytes.

4. A method according to claim 1, wherein after storing the operator's program the second memory zone is write protected, at least in part.

* * * * *

UNITED STATES PATENT AND TRADEMARK OFFICE
CERTIFICATE OF CORRECTION

PATENT NO.   : 5,894,550
DATED        : April 13, 1999
INVENTOR(S)  : Fabien THIRIET It is certified that error appears in the above-identified patent and that said Letters Patent is hereby corrected as shown below:

On the title page: Item [73] Assignee:     change the name of the Assignee from "Soliac" to --Solaic--.

Item [56] Attorney, Agent, or Firm:     change the name of the Attorney, Agent, or Firm from "Griggin, Butler Whisenhunt & Szipl, LLP" to --Griffin, Butler, Whisenhunt & Szipl, LLP--.

Signed and Sealed this

Twelfth Day of October, 1999

Attest:

Q. TODD DICKINSON

*Attesting Officer*     *Acting Commissioner of Patents and Trademarks*